No. 649,347. Patented May 8, 1900.
F. J. PENNINGER.
CAR COUPLING.
(Application filed July 20, 1899.)
(No Model.)
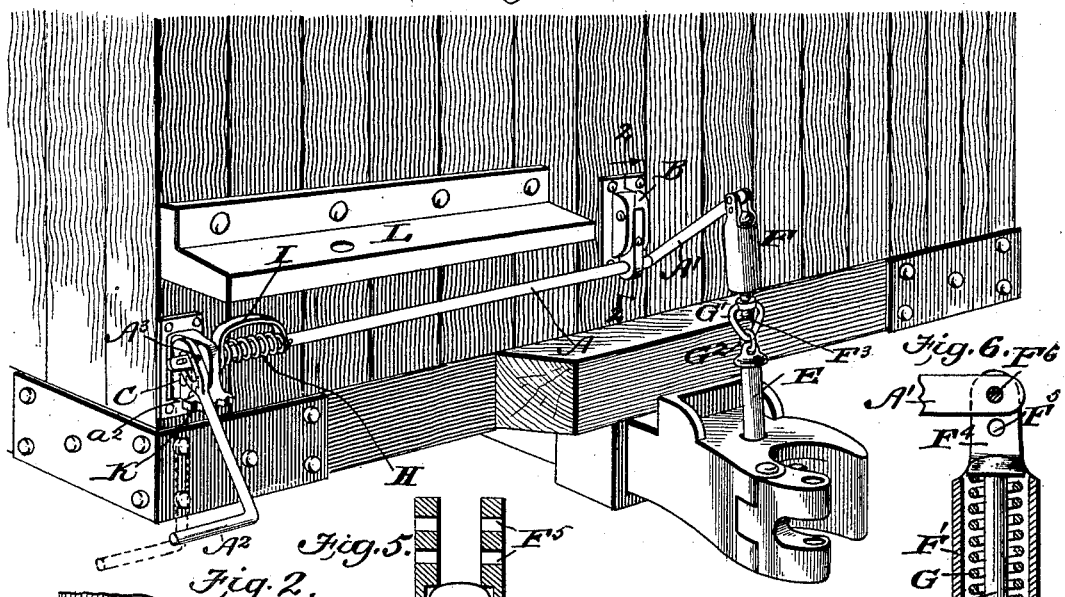
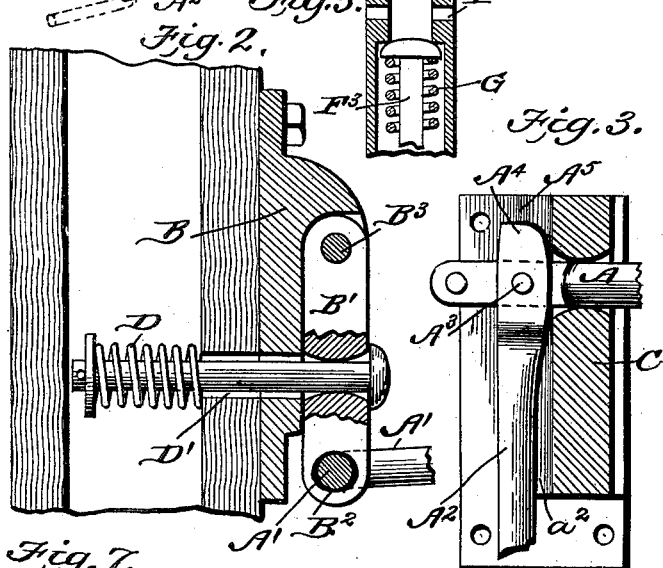
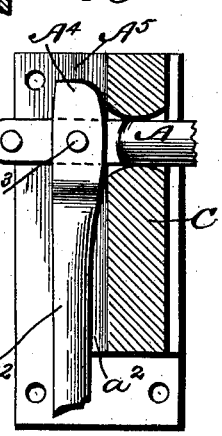
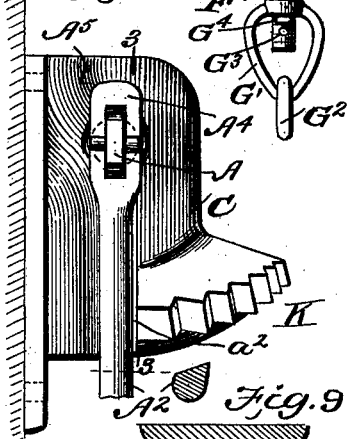
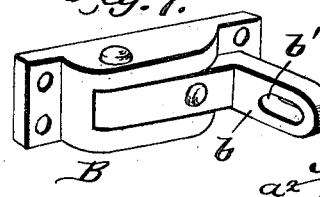
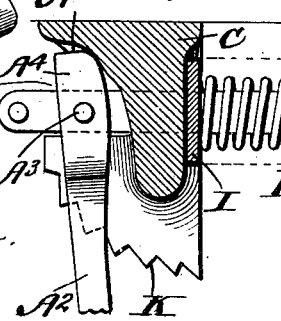
WITNESSES:
INVENTOR
Frank J. Penninger.
BY
ATTORNEYS.

UNITED STATES PATENT OFFICE.

FRANK JOHN PENNINGER, OF WASHINGTON, DISTRICT OF COLUMBIA.

CAR-COUPLING.

SPECIFICATION forming part of Letters Patent No. 649,347, dated May 8, 1900.

Application filed July 20, 1899. Serial No. 724,878. (No model.)

*To all whom it may concern:*

Be it known that I, FRANK JOHN PENNINGER, a citizen of the United States, residing at Washington, in the District of Columbia, have invented a new and useful Improvement in Car-Couplings, of which the following is a specification.

My invention is an improvement in car-couplings, having for an object to provide improvements in the devices for uncoupling; and the invention consists in certain novel constructions and combinations of parts, as will be hereinafter described, and pointed out in the claims.

In the drawings, Figure 1 is a perspective view of a portion of one end of a box-car provided with my improvement. Fig. 2 is a detail vertical section on about line 2 2 of Fig. 1. Fig. 3 is a detail vertical section on about line 3 3 of Fig. 4. Fig. 4 is a detail side view of the bearing-bracket for the outer end of the uncoupling-shaft, showing such shaft and its crank-handle in place. Figs. 5 and 6 are detail views of the spring-link for connecting the coupling device with the lifting-crank of the uncoupling-shaft. Fig. 7 is a detail perspective view illustrating a modification for use on gondola or other flat-cars, and Figs. 8 and 9 are detail sectional views illustrating the operation of the crank-handle on the cam-surface adjacent to the outer bearing of the shaft.

In carrying out my invention I employ an uncoupling-shaft A, which is provided at its inner end with a crank A' for connection with the coupling devices and at its outer end with a crank-handle $A^2$, which is preferably pivoted to the shaft A at $A^3$ and is provided with a short extension $A^4$ beyond said pivot, which extension rides on the inclined or cam surface $A^5$, adjacent to the outer bearing for the shaft A, in turning the said shaft to position to uncouple the coupling.

The shaft A is journaled in an inner bearing B and an outer bearing C. The inner bearing B is shown in detail in Fig. 2 and comprises a swinging bar B', having the bearing or journal $B^2$ for the shaft A at one end and pivoted at its other end $B^3$, so the journal end of the bar B' can swing forward to permit the forward adjustment of the inner end of the shaft A to correspond with the movement of the draw-head when the latter is drawn outward under the strain of draft. The bar B' is normally retracted and permitted to swing forward by the spring D encircling the pin D' and operating, as will be understood from Fig. 2.

The outer end of the crank A' is connected with the pin E or other suitable coupling device by the spring connection F. (Shown in Fig. 1 and illustrated in detail in Figs. 5 and 6.) This spring connection is composed of a casing F', provided in its lower end with an opening $F^2$ for the bolt $F^3$ and has at its upper end the lugs $F^4$, provided with the plurality of openings $F^5$ for the pin $F^6$, which secures the connection F to the crank A', thus permitting the adjustment of the connection F upon the crank A' as desired. The bolt $F^3$ has at its upper end a suitable head, and the spring G bears between such head and the bottom of the casing F', as shown in Fig. 6. The bolt $F^3$ extends through and below the casing F' and is threaded to receive the link G', which connects with the ring $G^2$ of the coupling device E. The bolt $F^3$ is provided with a series of perforations $G^3$, ranging from its lower end to receive the cross pin or key $G^4$, which may be inserted, as shown in Fig. 6, to prevent the accidental offturning of the link G', which is threaded on said bolt, as shown in Fig. 6. This spring connection aids in permitting the free longitudinal movement of the draw-head without injury to the uncoupling devices and also enables the convenient adjustment of the parts to properly uncouple by the operation of the shaft A when so desired.

The shaft A has a slight longitudinal movement in both its inner and outer bearings, such movement in the outward direction being spring-resisted by means of the coil-spring H and the bow-spring I, arranged as shown in Figs. 1 and 8, from which it will be seen that the bow-spring I overlies the coil-spring H and both springs H and I react between the outer bearing for the shaft A and a pin J on the said shaft, as shown in Fig. 8, thus tending to force the shaft A inward and to hold it in such position and to readjust it to such position when displaced by the crank-handle, as presently described.

The crank-handle bears at its extension A⁴ against the cam-surface A⁵, and when turned to the position shown in Fig. 1 will lift the coupling device E and will be held in such position by engagement with the rack K, as shown in Figs. 1, 4, and 8. As the handle A² is turned to the position shown in Figs. 1 and 8 the riding of its extension A⁴ on the cam-surface A⁵ will put the springs H and I under tension and so actuate the shaft A longitudinally as to secure the handle A² firmly in engagement with the rack K, so it will not be accidentally displaced.

By my invention it will be seen I furnish an uncoupling device which operates on a hinged principle and is adapted for uncoupling all forms of Master Car-Builders' couplers which ordinarily require a special uncoupling device. By my invention the coupling device can be operated at different heights and can be held in uncoupled position. It will also be noticed that I employ a special spring construction which so operates upon the uncoupling-shaft as to hold the crank-lever in the desired position, either coupled or uncoupled, as well as a spring connection between the crank-arm and the coupling device, which will yield in the direction of the coupler when the pulling strain is very excessive or when such strain would tend to break an unyielding connection. This spring connection also permits a yielding lengthwise or sidewise of the draw-head, while the swinging bearing-bar B' aids in permitting the longitudinal movement of the draw-head under strain.

As shown in Fig. 1, I provide a guard L, which extends over the uncoupling devices, and being fixed rigidly to the end of the car operates to protect the uncoupling devices from the weather and from damage from colliding cars when pushed against each other, either accidentally or intentionally.

In the construction shown in Fig. 1 the swinging bearing-bar is adapted for use on box-cars or other cars which have ample room vertically for the play of the bar B'. In gondola-cars and other flat-cars it may be desired to arrange the bearing-bars horizontally, as shown in Fig. 7, instead of vertically, as shown in Fig. 1. In the construction shown in Fig. 7 the bearing-bar is provided with a right-angular forwardly-projecting arm b, which is provided with the opening b', in which the shaft A journals. In other respects the bearing-bar shown in Fig. 7 may be constructed and actuated like that shown in Figs. 1 and 2.

In dotted lines, Fig. 1, and in full lines, Fig. 4, I show the operating-handle A² seated in the notch a³, which serves to hold said handle from accidentally swinging or jolting forward in such manner as to release the coupling. It will be seen that the springs H and I operate to hold the operating-handle A² firmly in the notch a³ until it is intentionally released.

Having thus described my invention, what I claim, and desire to secure by Letters Patent, is—

1. A car-coupler having an uncoupling device comprising a shaft provided at its inner end with means for releasing the coupling device and a bar swinging in the direction of the length of the car and having a bearing for the inner end of said shaft, substantially as set forth.

2. In a car-coupler substantially as described, the combination of the shaft provided at its inner end with means for operating the coupling device, a swinging bar having near one end a bearing for said shaft, a support to which said bar is pivoted at its opposite end and a spring-actuated bolt engaging said bar whereby to normally retract the same, substantially as set forth.

3. The combination of the shaft for uncoupling the coupling device, bearings in which said shaft is movable longitudinally, an operating crank-handle pivoted to said shaft, and a cam-surface on which said crank-handle operates, and a spring for resisting the endwise movement of the shaft, substantially as set forth.

4. The combination with the uncoupling-shaft and bearings in which said shaft is movable longitudinally, of the operating crank-handle pivoted to the uncoupling-shaft, spring devices for operating said shaft longitudinally, a cam-surface engaged by the crank-handle, and a rack with which the crank-handle engages, substantially as set forth.

5. In a car-coupling, the combination of the uncoupling-shaft having the operating-handle, the coupling devices arranged for operation by such shaft, a coil-spring on said shaft for actuating the shaft longitudinally, a bow-spring extending outside of and alongside the coil-spring and fitted at its ends on the shaft at the opposite ends of the coil-spring, and a rack or plate having a notch in which the operating-handle is held when the parts are in coupled position, substantially as set forth.

6. In a car-coupling, the combination with the uncoupling-shaft having a crank-arm, of the connection between said arm and the uncoupling device, such connection consisting of a casing provided with lugs having a plurality of openings for the bolt which secures it to the crank-arm, a headed bolt passed through said casing and having at its lower end an adjustable link for connection with the uncoupling devices, and a spring in said casing, substantially as set forth.

7. In a car-coupling, the combination of the uncoupling-shaft movable lengthwise in its bearings, the handle-lever pivoted to said shaft and having at one end an extension, a cam-surface arranged for engagement by said extension, a detent-rack arranged for engagement by the handle-lever and spring devices for actuating the shaft longitudinally, substantially as set forth.

8. The combination of the longitudinally-movable shaft for uncoupling the coupling device, an operating crank-handle on said shaft, a cam-surface on which said handle operates, a notch being provided for said handle at the end of said cam-surface and a spring actuating the shaft endwise, substantially as set forth.

FRANK JOHN PENNINGER.

Witnesses:
S. L. WEBB,
W. B. DAVIS.